United States Patent
Ganesh et al.

(10) Patent No.: US 7,571,459 B2
(45) Date of Patent: Aug. 4, 2009

(54) SYSTEM AND METHOD FOR ZONE TRANSITION MITIGATION WITH RELATION TO A NETWORK BROWSER

(75) Inventors: Shankar Ganesh, Bellevue, WA (US);
Roberto A. Franco, Seattle, WA (US);
Kurt James Schmucker, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 558 days.

(21) Appl. No.: 10/835,909

(22) Filed: Apr. 30, 2004

(65) Prior Publication Data

US 2005/0246772 A1    Nov. 3, 2005

(51) Int. Cl.
*G06F 17/00* (2006.01)
*G06F 15/16* (2006.01)
*H04L 29/06* (2006.01)

(52) U.S. Cl. .......................... 726/1; 713/166; 709/226; 709/229

(58) Field of Classification Search ....................... None
See application file for complete search history.

(56) References Cited

U.S. PATENT DOCUMENTS

| 6,308,273 | B1 * | 10/2001 | Goertzel et al. ................ 726/9 |
| 6,321,334 | B1 | 11/2001 | Jerger et al. ................ 713/200 |
| 6,366,912 | B1 * | 4/2002 | Wallent et al. ................ 707/9 |
| 6,473,800 | B1 * | 10/2002 | Jerger et al. ................ 709/226 |
| 6,567,918 | B1 * | 5/2003 | Flynn et al. ................ 726/7 |
| 6,609,198 | B1 * | 8/2003 | Wood et al. ................ 713/155 |
| 6,854,016 | B1 * | 2/2005 | Kraenzel et al. ............ 709/229 |
| 2005/0114658 | A1 * | 5/2005 | Dye et al. ................ 713/165 |
| 2005/0235351 | A1 * | 10/2005 | Seltzer et al. ................ 726/14 |

OTHER PUBLICATIONS

Pescatore, J, "Secure use of the World Wide Web: keeping browsers and servers from getting snared," Nov. 4-6, 1996, Northcon/96, pp. 36-39.*

* cited by examiner

*Primary Examiner*—Kaveh Abrishamkar

(57) ABSTRACT

A method and system for determining whether to allow a network browser action when a transition occurs between security zones as a result of the action is provided. Gaining access to a local machine zone may be a goal for unauthorized entities attempting to improperly access a user's content. The present invention therefore may be initiated to block transitions from the security zones with stricter security restrictions to zones with less security restrictions. In addition, a selected alternative may be commenced depending on the relative weight of the security zones involved the zone transition. Depending on the relative weight of security zones, the transition between zones may be allowed, prevented, or the user may be prompted to decide whether to allow or prevent the action that results in the zone transition.

23 Claims, 5 Drawing Sheets

SYSTEM AND METHOD FOR ZONE TRANSITION MITIGATION WITH RELATION TO A NETWORK BROWSER

BACKGROUND OF THE INVENTION

Information stored on the Internet may become available to unauthorized users who exploit security vulnerabilities. One security vulnerability may involve improper access to a particular URL (Uniform Resource Locator) security zone. A URL security zone includes a group of URL namespaces that are assigned an equal level of permissions (or trust). Each URL action for the zone has an appropriate URL policy assigned to it that reflects the level of trust given to the URL namespaces in that zone. The URL actions may include actions that a browser can take that might pose a security risk to the local computer. Actions that might pose a security risk include actions such as running a JAVA applet or an ACTIVEX control. The URL policy that controls these actions within the security zone, determines what permission or trust level is set for a particular URL action. For example, the policy may dictate that the safety level for JAVA be set to high.

Certain browsers divide URL namespaces into URL security zones, which are assigned different levels of trust. The default URL security zones may be customized by changing the URL policy settings for each URL action. Each URL security zone has a set of URL actions with a URL policy assigned to each action. A URL policy is assigned to each URL action to determine how that URL action is handled. A number of default security zones have been created to assist in the assignment of security policies to various browser actions, including the intranet zone, trusted site zone, Internet zone, restricted sites zone, and local machine zone.

Users use the intranet zone for content located on an organization's intranet. Since the servers and information is within an organization's firewall, a user or organization can assign a higher trust level to the content on the intranet.

Users use the trusted sites zone for content located on Web sites that are considered more reputable or trustworthy than other sites on the Internet. Users can use this zone to assign a higher trust level to these sites to minimize the number of authentication requests. The user adds the URLs of these trusted Web sites to this zone.

Users use the Internet zone for Web sites on the Internet that do not belong to another zone. This default setting causes the Web browser to prompt the user whenever potentially unsafe content is ready to download. Web sites that are not mapped into other zones automatically fall into this zone.

Users use the restricted sites zone for Web sites that contain content that can cause, or may have previously caused, problems when downloaded. Users can use this zone to cause the Web browser to alert them whenever potentially unsafe content is about to download, or to prevent that content from downloading. The user adds the URLs of these mistrusted Web sites to this zone.

The local machine zone is an implicit zone for content that exists on the local computer. The content found on the user's computer, except for content that Web browser caches on the local system, is treated with a high level of trust.

An entity attempting to improperly gain access to a user's computer, may attempt to get access through the local machine zone. The entity may attempt to navigate from one zone to a higher security zone, such as to the local machine zone, to gain access to otherwise restricted content. Attempting to "elevate" the zone status of a web page is one method by which an unauthorized entity may infiltrate a user's restricted content.

SUMMARY OF THE INVENTION

The present invention is directed toward a method and system for zone transition mitigation. When a Web page is opened in a browser, the browser puts restrictions on what the page can do based on from where that Web page came, e.g., from the Internet, from a local intranet server, from a trusted site, or other sources. Web pages on a user's computer that are in the local machine zone have the fewest security restrictions. Gaining access to a local machine zone may be a goal for unauthorized entities attempting to improperly access a user's content. The present invention therefore blocks navigation to these zones with lower security restrictions while browsing the Internet. Accordingly, with the present invention, a browser prevents the overall security context for any child on a page to be higher than the security context of the root URL. Stated differently, that a page in first security zone is prevented from navigating to a second page in a higher security zone. For example, a page in the Internet zone is prevented from navigating to a page in the intranet zone, except as the result of a user initiated action. Other exceptions are also available for certain navigations or actions. For example, navigations from a lower security zone may be flatly blocked when navigation to the local machine zone, while navigations to the intranet zone or restricted zone accompany a user prompt on whether to proceed. In addition, navigations between zones may be selectively blocked, allowed, or have an accompanying user prompt. The present invention may also be applied to other actions than navigations that result in transition from one zone to another.

In accordance with one aspect of the present invention, a method for zone transition mitigation is provided where a first security privilege corresponding to a first resource is determined, and second security privilege corresponding to a second resource is determined. Once the first and second security privileges are determined, a determination is made whether to allow a transition between the first resource and the second resource based on the first security privilege and the second security privilege.

DETAILED DESCRIPTION OF THE PREFERRED EMBODIMENT

The present invention now will be described more fully hereinafter with reference to the accompanying drawings, which form a part hereof, and which show, by way of illustration, specific exemplary embodiments for practicing the invention. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Illustrative Operating Environment

Figure 1:
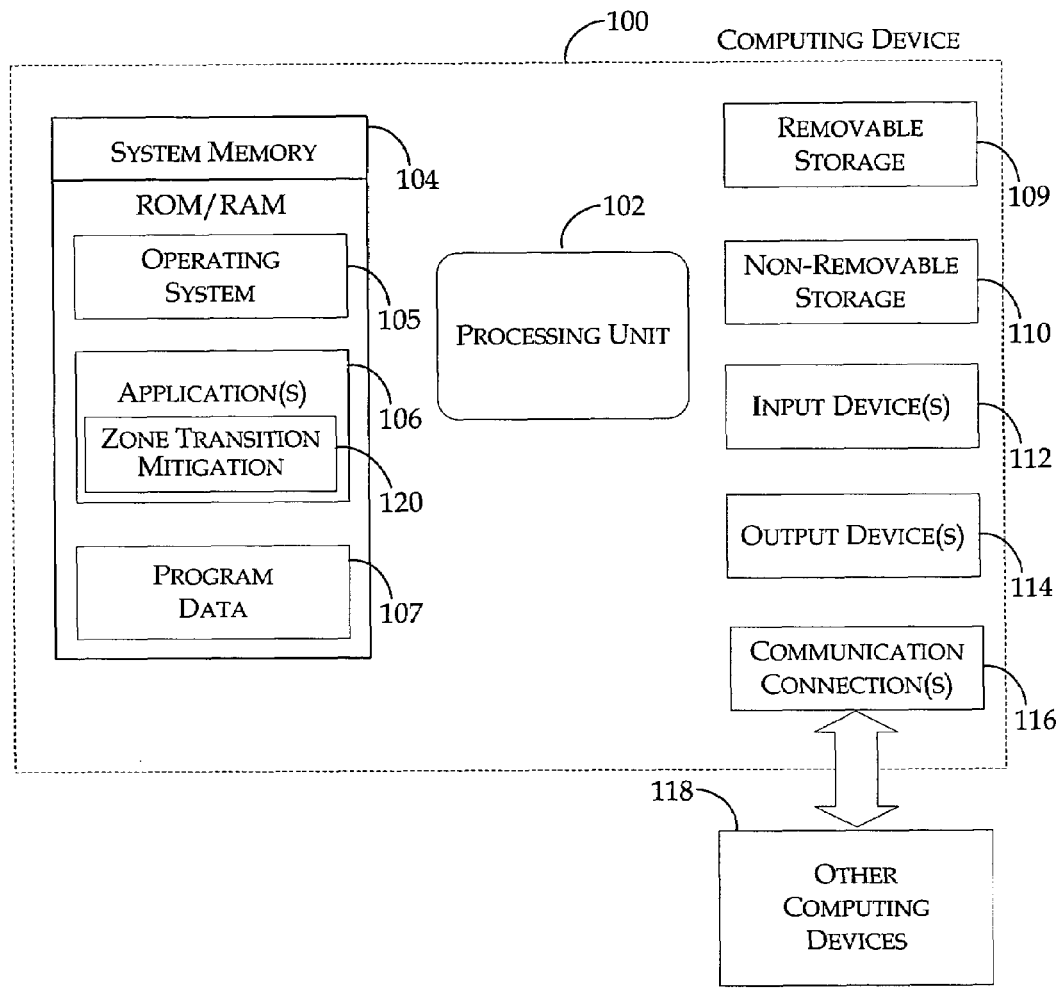
FIG. 1 illustrates a computing device that may be used according to an example embodiment of the present invention.

With reference to FIG. 1, one example system for implementing the invention includes a computing device, such as computing device 100. Computing device 100 may be configured as a client, a server, mobile device, or any other computing device that provides security zones for a network browser. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more applications 106 such as a zone transition mitigation application 120, and may include program data 107. The present invention, which is described in detail below, is implemented within system memory 104.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included.

Computing device 100 also contains communication connections 116 that allow the device to communicate with other computing devices 118, such as over a network. Networks include local area networks and wide area networks, as well as other large scale networks including, but not limited to, intranets and extranets. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Zone Transition Mitigation

Previously, security zones were conceived to provide transparent boundaries that prevent certain Web-based applications from performing unauthorized actions with a network browser. To control Web security, a user may add and remove sites from a zone, depending on the functionality desired for a particular site. During browser operation, the browser checks every site that is accessed for its security zone membership. If a site's address has membership in one of the zones, then the browser applies that zone's security permissions to all interaction with that site. In this way, security zones have offered a method of grouping sites by security classifications.

The present invention extends the security zone concept by mitigating transitions between security zones. When a navigation occurs or other event that causes a transition from one security zone to another, the present invention provides a system and set of alternatives to mitigate transitions that may compromise security. The system and alternatives are described more fully with relation to the figures and descriptions provided below.

Figure 2:
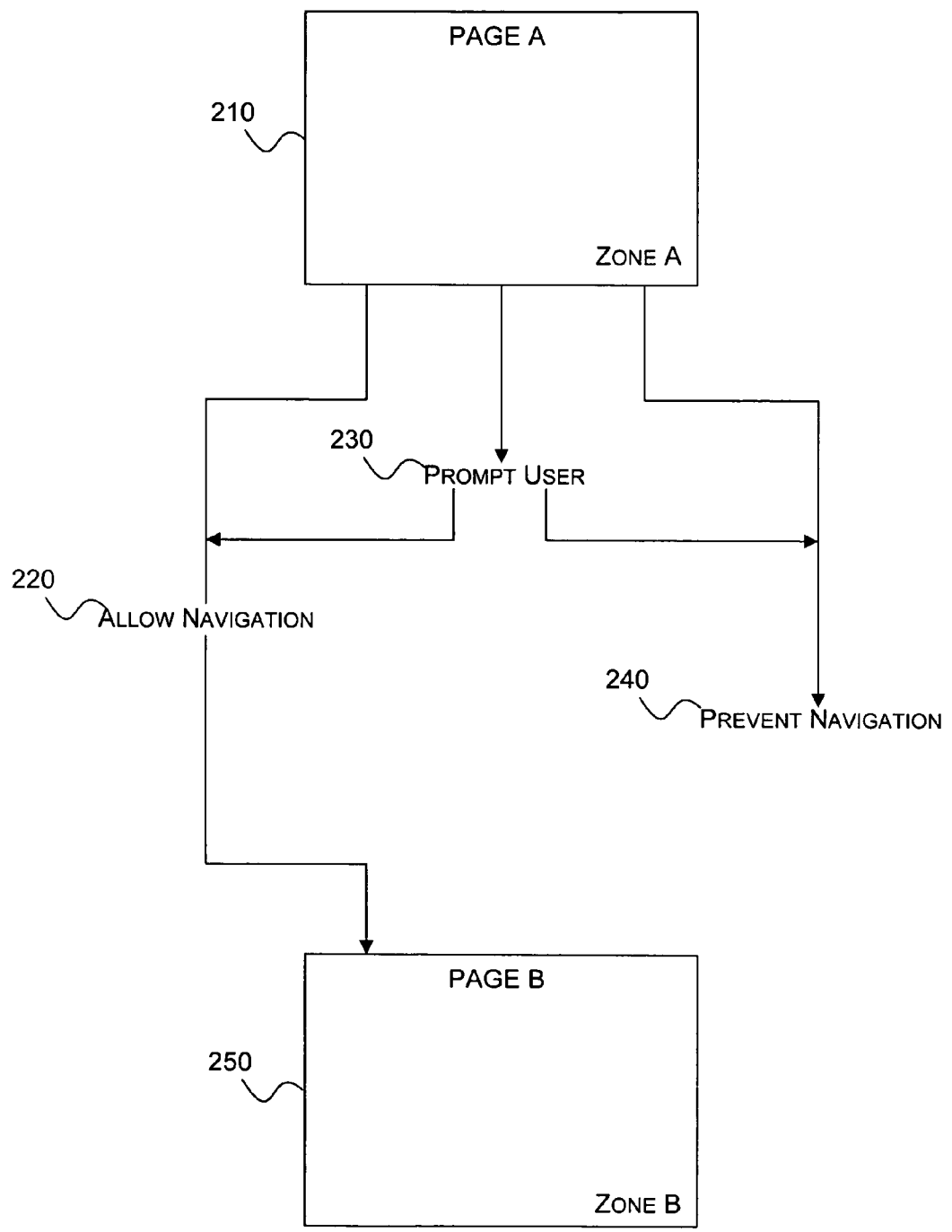
FIG. 2 is a functional block diagram illustrating a navigation in relation to security zones, in accordance with the present invention.

FIG. 2 is a functional block diagram illustrating a navigation in relation to security zones, in accordance with the present invention. A navigation between a first page, page A 210, and a second page, page B 250 is shown that illustrates exemplary navigation alternatives.

Each page (210, 250) has an associated security zone. In the current example, page A 210 has a security zone A and page B 250 has a security zone B. Depending on the relative "weight" of the security zones, the navigation may be allowed 220, the user may be prompted 230, or the navigation may be prevented 240. The relative "weight" between the security zones refers to the difference in security level applied to each of the zones. For example, the local machine zone has a higher security level applied than the Internet zone. A weight difference therefore exists between the local machine zone and the Internet zone. Correspondingly, the trusted site zone and the intranet zone may have similar levels of security applied. The relative weight between the trusted site zone and the intranet zone is therefore substantially equal. An allowed navigation between page A 210 and page B 250 therefore depends in the relative weight of security zone A and security zone B.

In one embodiment, the default setting for a transition from a security zone with a higher level of security applied to a security zone with a lower level of security applied is prevented. In another embodiment, the security zones are ranked according to their security context. The ranking of the default security zones from highest security context to lowest security context is therefore: restricted sites zone, Internet zone, intranet zone, trusted sites zone, and local machine zone. The security zone with the highest security context therefore has the lowest security level applied. The present invention therefore, by default, prevents a security zone with a lower security context to transition to a security zone with a higher security context. Preventing these transitions protects a user's content from being accessed by unauthorized entities that are attempting to improperly elevate their zone context. Exceptions to the default setting may change the behavior for certain zone transitions. For example, an administrator or the user may select to allow transitions from a lower security zone to a higher security zone for certain circumstances.

Furthermore, the present invention is not limited to the alternatives of preventing a navigation, allowing the navigation, or prompting the user. Other alternatives may be applied depending on the relative weight between the source zone and the destination zone. In addition, other activities associated with the Web browser in relation to a resource may also cause a transition between security zones. The method of the present invention is therefore not limited to navigations between Web pages.

Figure 3:
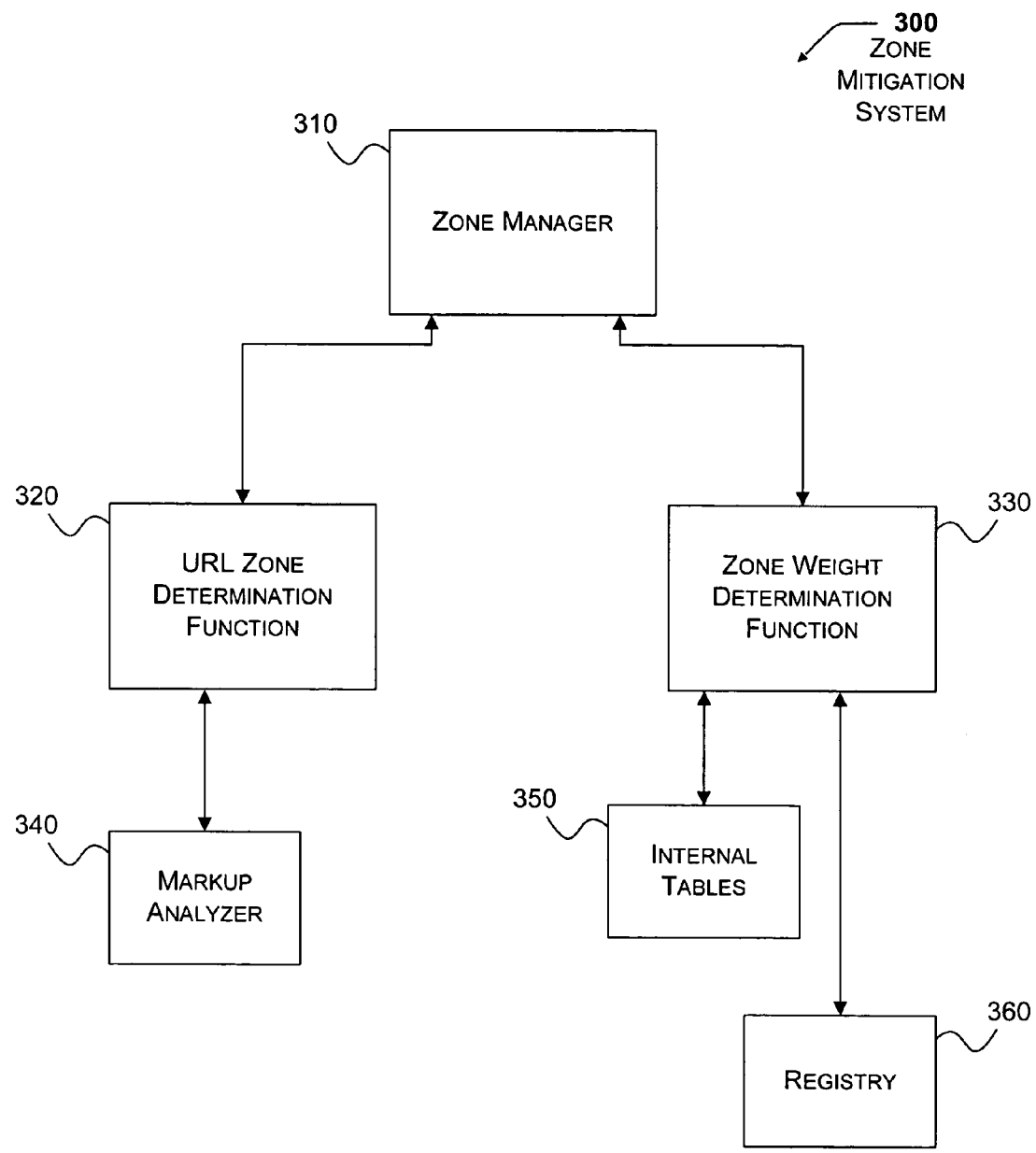
FIG. 3 is a functional block diagram illustrating a system for zone transition mitigation, in accordance with the present invention.

FIG. 3 is a functional block diagram illustrating a system for zone transition mitigation, in accordance with the present invention. The system 300 includes a zone manager 310, a URL zone determination function 320, a zone weight determination function 330, a markup analyzer 340, internal tables 350, and registry 360.

In one embodiment, implementing the present invention involves determining the security zones for the source resource and the destination resource of a navigation, determining the relative weight of the security zones, and applying the appropriate alternative depending on these determinations to allow or prevent the navigation.

URL zone determination function 320 is used to determine the security zone of the source resource and the security zone of the destination resource. Resources refer to Web pages, scripts, applets, or other resources within a Web page that have an associated security zone. In one embodiment, URL zone determination function 320 queries zone manager 310 and markup analyzer 340 to determine the security zone associated with a resource. An exemplary process for determining the security zones associated with a source resource and destination resource of a navigation is described in greater detail with relation to FIG. 5 below.

Zone weight determination function 330 is used to determined the relative weight between security zones of the source resource and the destination resource. Zone weight determination function 330 communicates with zone manager 310 and accesses internal tables 350 and registry 360 in making the weight determination. Internal tables 350 include the relative weight determination for the comparisons of the security zones of the source resource and the destination resource. Registry 360 includes registry keys that include references to each security zone type (e.g., local machine zone, restricted zone, trusted zone, intranet zone, internet zone). Registry values are included in registry 360 for allowing an action, preventing an action, or prompting the user. For example, if a registry value is 0×00 the action is allowed, if a value is 0×01 the user is prompted, and if a value is 0×03 the action is not allowed. When the action is a navigation between resources, the alternative corresponding to the registry entry is applied to allow the navigation, prevent the navigation, or prompt the user to select whether to allow or prevent the navigation. An exemplary process for determining the relative weight of security zones and applying the appropriate alternative is described in greater detail with relation to FIG. 4 below.

Figure 4:
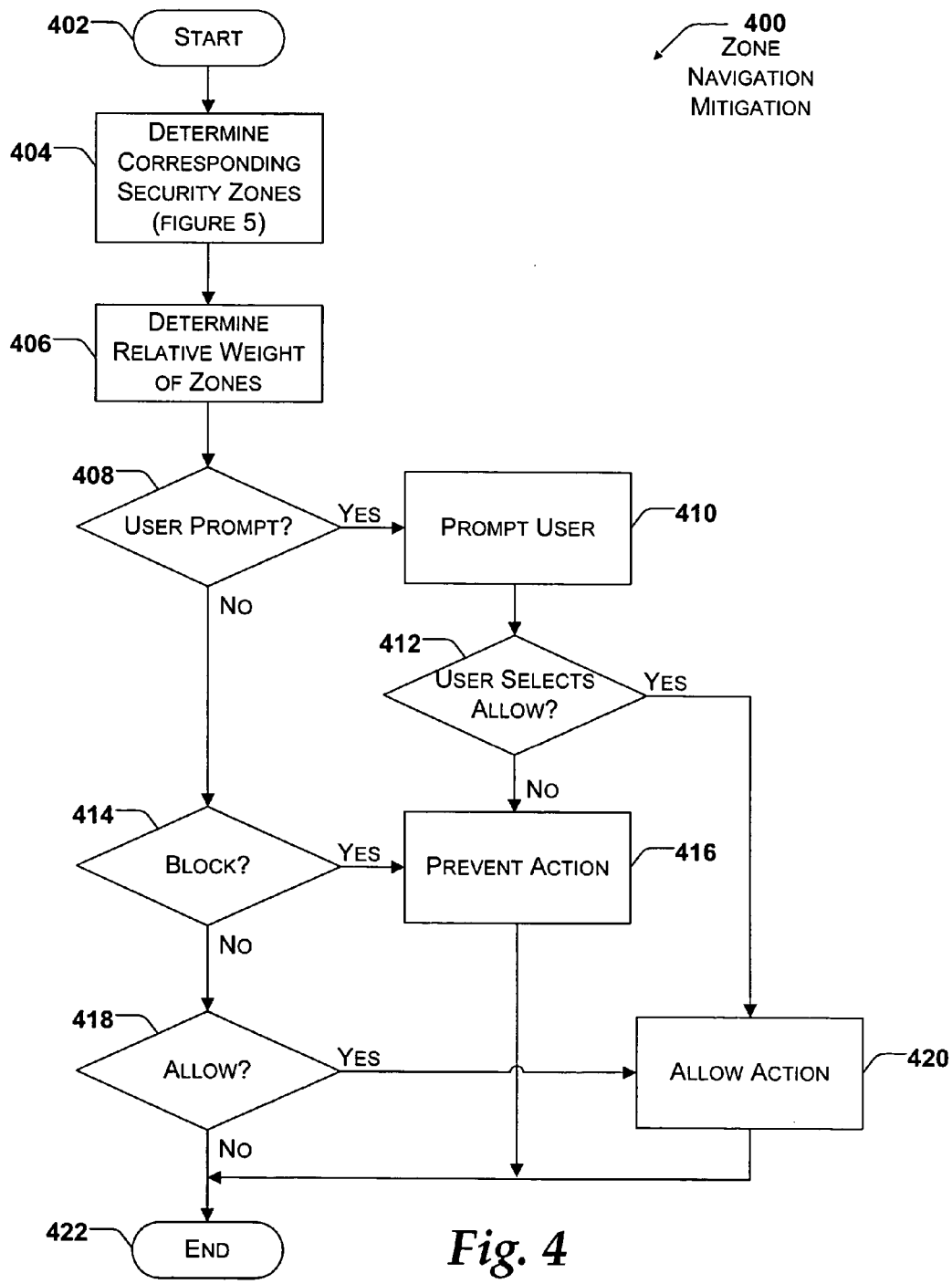
FIG. 4 is an operational flow diagram illustrating a process for mitigating zone transitions, in accordance with the present invention.

FIG. 4 is an operational flow diagram illustrating a process for mitigating zone transitions, in accordance with the present invention. Process 400 starts at block 402 where a navigation from a source resource to a destination resource has been initiated. Processing continues at block 404.

At block 404, a determination is made for the security zones, or security privileges, corresponding to resources involved in an network browser action. When the action is a navigation, the security zone that is associated with the source resource and the security zone associated with the destination resource are determined. An exemplary process for determining the security zones associated with a resources involved in an action is described in greater detail with relation to FIG. 5 below. Once the associated security zones are determined, processing continues at block 406.

At block 406, a determination is made of the relative weight between the security zones. In the case of a navigation, the relative weight between the source zone and the destination zone is determined to initiate the corresponding alternative for the zone transition. As previously stated, the relative weight of the source zone to the destination zone may be determined according to internal tables (e.g., internal tables 350 in FIG. 3). Processing continues at decision block 408.

At decision block 408, a determination is made whether the relative weight between the security zones indicates to prompt the user for a decision. If the determination is that the alternative for prompting the user is to be initiated based on the relative weight of the security zones, processing moves to block 410. If however, the alternative for prompting the user is not to be initiated, processing moves to decision block 414.

At block 410, the user is promoted whether to allow or prevent the navigation that results in the zone transition. The user prompt may be initiated through a user interface or means of notification to request the user to select whether to allow or prevent the action that results in the transition between zones. Processing continues at decision block 412.

At decision block 412, a determination is made whether the user has selected to allow the action in response to the user prompt. If the user has not selected to allow the action, processing moves to block 416. If however, the user selects to allow the action, processing advances to block 420.

At decision block 414, a determination is made whether the relative weight between the security zones indicates to prevent the action that results in a zone transition. If the determination is that the alternative for preventing the action is to be initiated based in the relative weight of the security zones, processing moves to block 416. If however, the alternative for preventing the action is not to be initiated, processing moves to decision block 418.

At block 416, the action that would have resulted in the zone transition is prevented. In one instance, as previously described, the action may be navigation from a first Web page to a second Web page. Once the action is prevented, processing advances to block 422, where process 400 ends and processing moves to other tasks.

At decision block 418, a determination is made whether the relative weight between the security zones indicates to allow the action that results in a zone transition. If the determination is that the alternative for allowing the action is to be initiated based in the relative weight of the security zones, processing moves to block 420. If however, the alternative for allowing the action is not to be initiated, processing moves to block 422, where process 400 ends and processing moves to other tasks.

At block 420, the action that results in the zone transition is allowed. In one instance, as previously described, the action may be navigation from a first Web page to a second Web page. Once the action is allows and the zone transition occurs, processing advances to block 422, where process 400 ends and processing moves to other tasks.

Process 400 may be applied various actions other than navigations, such as the initiation of scripts on Web page, or other actions that may result in a zone transition. Furthermore, exceptions to process 400 may also occur. For example, an action that results in a zone transition may be user initiated.

In the case of user initiated actions, the other process steps may be avoided in favor of allowing the action to enhance user experience with the network browser. In addition, a security context may not have been established or may not be determinable for certain resources. The method of the present invention may be extended to prevent actions involving resources without a specified security context.

Figure 5:
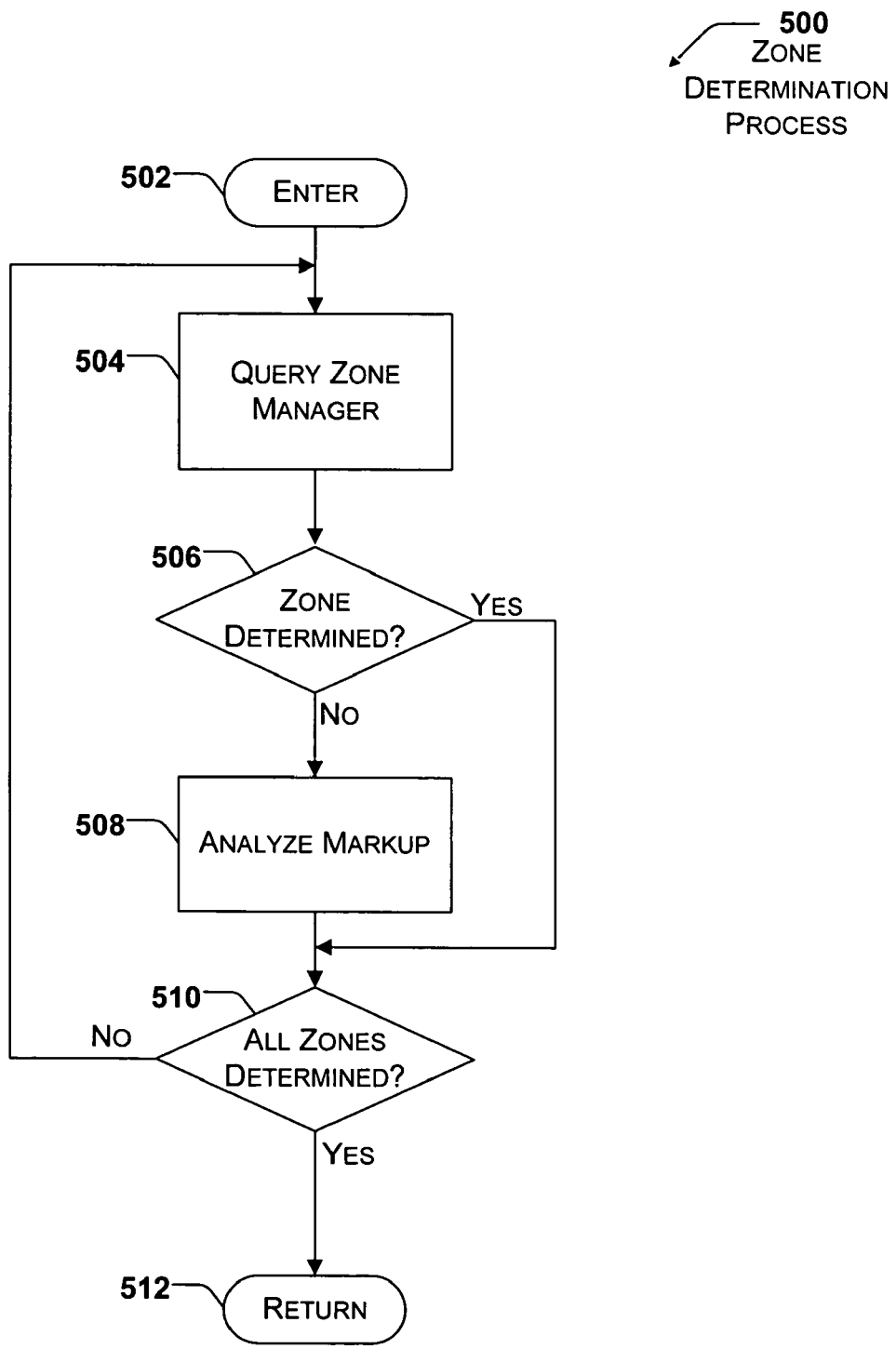
FIG. 5 is an operational flow diagram illustrating a process for determining zones with relation to a source resource and destination resource, in accordance with the present invention.

FIG. 5 is an operational flow diagram illustrating a process for determining zones with relation to a source resource and destination resource, in accordance with the present invention. Process 500 enters at block 502 where process 400 enters block 404 shown in FIG. 4. Processing continues at block 504.

At block 504, the zone manager is queried to determine the security zone of a particular resource. For example, when a navigation occurs, a security zone associated with the source resource and a security zone associated with the destination resource are determined. In certain instances the security zone of the source resource or destination resource is known by the zone manager. Once the zone the manager is queried, processing moves to decision block 506.

At decision block 506, a determination is made whether the query to the zone manager resulted in discovering the associated security zone of the particular resource. If the associated security zone is determined, processing advances to decision block 510. If however, the associated security zone for the particular resource is not provided by the zone manager, processing continues at block 508.

At block 508, the markup or code associated with a particular resource is examined to determine the associated security zone. For example, for a Web page, the URL may be examined to determined the security zone that should be associated with the Web page. Once the associated security zone is determined, processing moves to decision block 510.

At decision block 510, a determination is made whether all the associated security zones for the resources involved in a zone transition have been determined. If all the security zones for resources involved have not been determined, processing returns to block 504, where the process 500 is repeated for the next resource. If however, all of the security zones for the resources involved have been determined, processing continues to block 512, where processing returns to block 406 of process 400 shown in FIG. 4.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer-implemented method for security privilege transition mitigation between web pages that are associated with different security zones while a user is browsing, comprising:
   accessing, using a computing device, a first web page at a first Uniform Resource Locator (URL) in a web browser having a first security context determined from the first web page that is associated with a first security zone having a first security level;
   determining, using the computing device, when an event occurs that requests a navigation to occur from the first web page to a second web page at a second URL having a second security context determined from the second web page that is associated with a second security zone having a second security level; and
   determining, using the computing device, when to allow the navigation to occur from the first web page to the second web page by determining when the first security context of the first web page is higher than or equal to the second security context of the second web page.

2. The computer-implemented method of claim 1, further comprising preventing, using the computing device, the navigation between the first web page and the second web page when the first security level is lower than the second security level.

3. The computer-implemented method of claim 1, wherein determining whether to allow the navigation further comprises prompting a user, using the computing device, to select whether to allow the transition by requesting from the user whether to allow or prevent the navigation from the first web page to the second web page.

4. The computer-implemented method of claim 1, wherein determining the first security level further comprises querying a zone manager, using the computing device, for the first security level corresponding to the first web page.

5. The computer-implemented method of claim 1, wherein determining the first security level further comprises analyzing a markup associated with the first resource, using the computing device, to determine the first security privilege corresponding to the first resource.

6. The computer-implemented method of claim 1, wherein determining whether to allow the transition further comprises determining, using the computing device, a relative weight between the first security privilege and the second security level.

7. The computer-implemented method of claim 6, further comprising applying, using the computing device, an alternative depending on the relative weight between the first security level and the second security level, wherein the alternative includes at least one of allowing the transition, preventing the transition, and prompting a user.

8. The computer-implemented method of claim 1, further comprising allowing, using the computing device, the transition navigation when the transition between the first resource and the second web page is a result of a user initiated action.

9. The computer-implemented method of claim 1, further comprising preventing, using the computing device, the transition navigation between the first web page and the second web page when the first security level is undeterminable.

10. A computer-readable medium that includes computer-executable instructions which, when executed by a computing device, implement a method comprising:
    determining a first security zone that is associated with a first Uniform Resource Locator (URL);
    determining when an attempt is made to navigate to a second security zone that is associated with a second URL;
    determining whether to allow the navigation from the first URL to the second URL based upon an examination of a first security privilege that is associated with the first security zone and an examination of a second security privilege that is associated with the second security zone; wherein the determination is made by examining only the first URL and second URL; and
    preventing the navigation from the first URL to the second URL when the first security zone has a first security context that is lower than a second security context associated with the second security zone.

11. The computer-readable medium of claim 10, wherein determining the first security privilege further comprises querying a zone manager for the first security privilege corresponding to the first web page.

12. The computer-readable medium of claim 10, wherein determining the first security privilege further comprises analyzing markup associated with the first web page to determine the first security privilege corresponding to the first web page.

13. The computer-readable storage medium of claim 10, wherein determining whether to allow the navigation further comprises determining a relative weight between the first security privilege and the second security privilege.

14. The computer-readable storage medium of claim 13, further comprising applying an alternative depending on the relative weight between the first security privilege and the second security privilege, wherein the alternative includes at least one of allowing the transition, preventing the transition, and prompting a user.

15. The computer-readable storage medium of claim 10, further comprising allowing the navigation when the navigation between the first web page and the second web page is a result of a user initiated action.

16. The computer-readable storage medium of claim 10, further comprising preventing the navigation between the first web page and the second web page when the first security privilege is undeterminable.

17. A system for mitigating transitions between security zones associated with a network browser, comprising:
   one or more processors; and
   one or more computer-readable storage media, comprising instructions that, when executed by the one or more processors, implement:
      a zone manager that is configured to manage the privileges associated with the security zones; wherein the security zones include a trusted sites zone, an Internet zone, a restricted sites zone, and a local machine zone;
      a zone determination function that is configured to determine security zones corresponding to resources that are associated with a network browser action; and
      a zone weight determination function that is configured to determine the relative weight between the security zones and apply an alternative based upon the relative weight; wherein the alternative prevents the network browser action when a first security zone has a first security context determined from a first web page that is lower than a second security context that is determined from a second web page.

18. The system of claim 17, wherein the difference between the first security context and the second security context corresponds to a relative weight difference between the first security zone and the second security zone.

19. The system of claim 17, wherein the zone determination function is further configured to query the zone manager for the security zones corresponding to resources that are associated with a network browser action.

20. The system of claim 17, wherein the zone determination function is further configured to analyze markup associated with the resources to determine the security zones corresponding to resources that are associated with a network browser action.

21. The system of claim 17, wherein the alternative includes at least one of allowing the transition, preventing the transition, and prompting a user.

22. The system of claim 17, wherein the zone manager is further configured to automatically allow the network browser action when the network browser action is a result of a user initiated action.

23. The system of claim 17, further comprising preventing the network browser action when at least one of the security zones corresponding to the resources that are associated with the network browser action is undeterminable.

* * * * *